(12) United States Patent
Shima (10) Patent No.: US 7,295,152 B2
(45) Date of Patent: Nov. 13, 2007

(54) TIMING ADJUSTMENT METHOD FOR RADAR, AND RADAR APPARATUS HAVING AUTOMATIC TIMING ADJUSTING FUNCTION

(75) Inventor: Nobukazu Shima, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 240 days.

(21) Appl. No.: 11/137,203

(22) Filed: May 24, 2005

(65) Prior Publication Data

US 2005/0280575 A1    Dec. 22, 2005

(30) Foreign Application Priority Data

Jun. 22, 2004    (JP) ............... 2004-183628

(51) Int. Cl.
*G01S 7/40* (2006.01)
*G01S 13/00* (2006.01)

(52) U.S. Cl. ......................... 342/174; 342/88

(58) Field of Classification Search ................. 342/174
See application file for complete search history.

(56) References Cited

U.S. PATENT DOCUMENTS

| | | | | |
|---|---|---|---|---|
| 2,729,815 A * | 1/1956 | Andrews et al. | ............ | 327/136 |
| 2,907,026 A * | 9/1959 | Wilson | ........................ | 342/205 |
| 3,048,838 A * | 8/1962 | Bretscher | .................... | 342/165 |
| 3,588,899 A * | 6/1971 | Strauch | ........................ | 342/87 |
| 5,315,304 A * | 5/1994 | Ghaleb et al. | ............... | 342/165 |
| 5,955,991 A * | 9/1999 | Kawakubo | .................. | 342/374 |
| 6,288,672 B1 * | 9/2001 | Asano et al. | ................ | 342/374 |
| 6,292,129 B1 * | 9/2001 | Matsugatani et al. | .......... | 342/70 |
| 6,573,859 B2 * | 6/2003 | Tokoro | ........................ | 342/70 |
| 6,720,912 B2 * | 4/2004 | Shono | ........................ | 342/198 |
| 6,859,168 B2 * | 2/2005 | Isaji | ............................ | 342/128 |
| 6,972,711 B2 * | 12/2005 | Shono | ........................ | 342/92 |

(Continued)

FOREIGN PATENT DOCUMENTS

JP    11-160423    6/1999

(Continued)

OTHER PUBLICATIONS

Patent Abstracts of Japan for Publication No. 11237466, date of publication Aug. 31, 1999, in the name of Y. Michiguchi et al.

(Continued)

*Primary Examiner*—Thomas H. Tarcza
*Assistant Examiner*—Shelley Chen
(74) *Attorney, Agent, or Firm*—Christie, Parker & Hale, LLP

(57) ABSTRACT

On/off timing of an amplifier and timing of antenna selection are accurately adjusted. When adjusting the on/off timing of the amplifier, modulation of a transmit signal is stopped, and a switch is set so as not to select any one of the antennas, thereby totally reflecting the transmit signal; in this condition, the timing is controlled so that the average value of the output level of a mixer becomes a minimum. When adjusting the antenna selection timing, modulation of the transmit signal is stopped, and a reflective object is placed in close proximity to the antenna; in this condition, the timing is adjusted so that the average value of the output level of the mixer becomes a maximum.

15 Claims, 5 Drawing Sheets

U.S. PATENT DOCUMENTS

| | | |
|---|---|---|
| 7,075,477 B2* | 7/2006 | Hiromori et al. ............. 342/82 |
| 7,173,561 B2* | 2/2007 | Isaji ............................ 342/70 |
| 2004/0207552 A1* | 10/2004 | Isaji ............................ 342/70 |
| 2004/0246168 A1* | 12/2004 | Isaji ............................ 342/70 |
| 2005/0219117 A1* | 10/2005 | Hiromori et al. ........... 342/165 |
| 2005/0280575 A1* | 12/2005 | Shima ......................... 342/174 |
| 2006/0055593 A1* | 3/2006 | Honda et al. ............... 342/174 |

FOREIGN PATENT DOCUMENTS

| | | |
|---|---|---|
| JP | H11-160423 | 6/1999 |
| JP | 11-237466 | 8/1999 |
| JP | 2000-155171 | 6/2000 |
| JP | 2000-284047 | 10/2000 |
| JP | 2002090447 | 3/2002 |
| JP | 2002-122661 | 4/2002 |
| JP | 2003-164122 | 1/2003 |

OTHER PUBLICATIONS

Patent Abstracts of Japan for Publication No. 2002090447, date of publication Mar. 27, 2002, in the name of T. Kimura.

* cited by examiner

(a) AMP16

(b) AMP18

(c) OUTPUT OF MIX 32

(d) OUTPUT OF LPF 62

(a) AMP 16

(b) SWITCH 12

(c) OUTPUT OF MIX 32

(d) OUTPUT OF LPF 62

TIMING ADJUSTMENT METHOD FOR RADAR, AND RADAR APPARATUS HAVING AUTOMATIC TIMING ADJUSTING FUNCTION

CROSS-REFERENCE TO RELATED APPLICATION

This application claims priority of Japanese Patent Application No. 2004-183628, filed on Jun. 22, 2004.

BACKGROUND OF THE INVENTION

1. Field of the Invention

The present invention relates to a method for adjusting amplifier on/off control timing and antenna selection control timing in a radar and, in particular, in an FM-CW radar that uses a duplexer, and also relates to a radar apparatus having an automatic timing adjusting function.

2. Description of the Related Art

An FM-CW radar projects forward a transmit wave frequency-modulated by a triangular wave, produces a beat signal by mixing a reflected wave from a target with a portion of the transmit wave in a mixer, and computes the distance and relative velocity of the target simultaneously from the beat frequencies produced during the increasing section and the decreasing section of the triangular wave. Such radars are commercially implemented as automotive radars.

Japanese Unexamined Patent Publication No. 2002-122661 describes an FM-CW radar that uses a single antenna for both transmission and reception, by using a duplexer, and discloses that a bias voltage to a transmitting amplifier and a bias voltage to a receiving amplifier are turned on and off in alternating fashion in order to prevent the transmit wave from leaking into the receiving side in the duplexer and interfering with the received signal.

In this case, if the end point of the ON period of the transmitting amplifier is separated from the start point of the ON period of the receiving amplifier by, for example, 3.3 nsec or more, reflected waves from a target located within a range of 1 m cannot be captured, and thus the short-range detection performance degrades. Conversely, if the end point of the ON period of the transmitting amplifier overlaps the start point of the ON period of the receiving amplifier, the transmit signal leaks, which increases noise in the short-range detection area and may result in the detection of a false target. If the leakage of the transmit signal becomes excessively large, a device failure may result. Accordingly, the relative timing of the two amplifiers must be accurately adjusted.

Further, Japanese Unexamined Patent Publication No. H11-160423 discloses an FM-CW radar employing a DBF (Digital Beam Forming) method that sequentially switches between a plurality of receiving antennas and determines the target direction by detecting the phase difference between the reflected waves received from the same target. Japanese Unexamined Patent Publication No. 2000-155171 discloses how an effect equivalent to using more receiving antennas than actually used, can be achieved by using a plurality of receiving antennas in an DBF system. Further, though not published at the time of this patent application, Japanese Patent Application No. 2003-164122 discloses a radar apparatus that achieves further reductions in size and weight by using a plurality of antennas for both transmission and reception in a DBF system.

Figure 1:
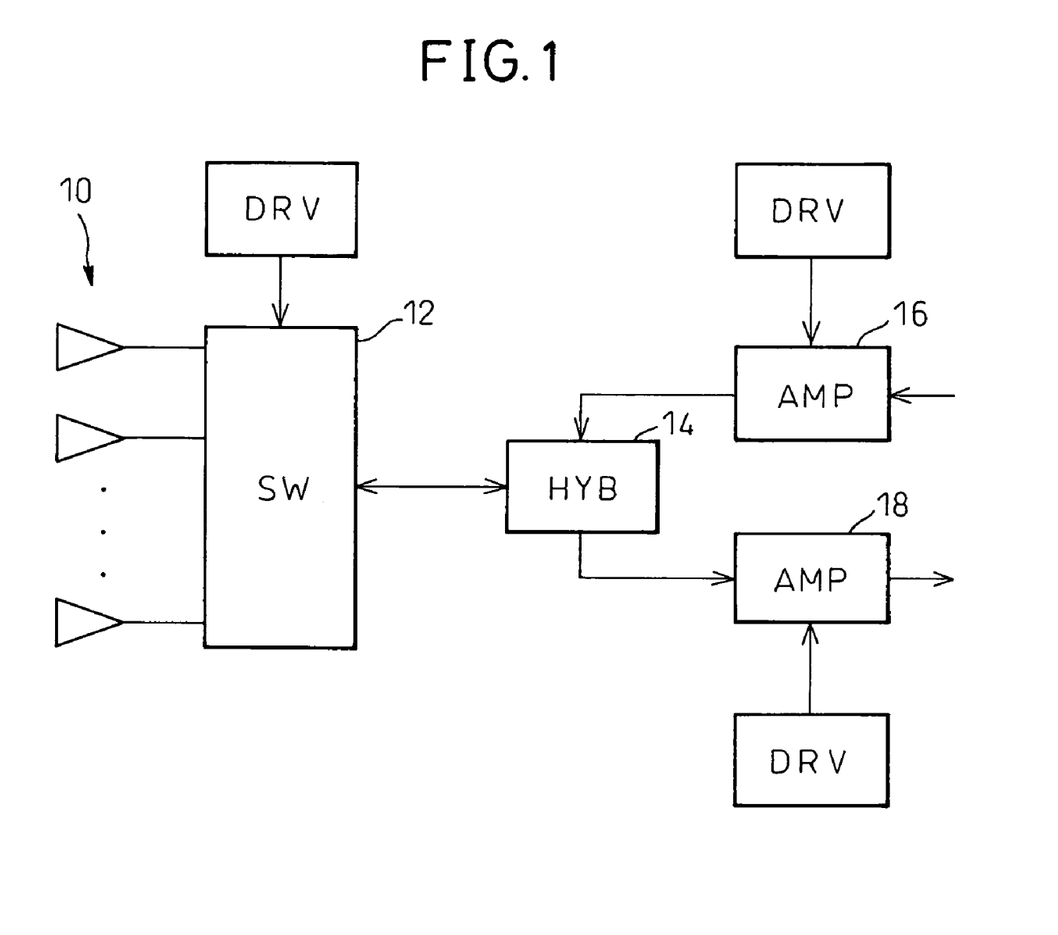
FIG. 1 is a diagram for explaining the configuration of a radar to which the present invention is to be applied.
Figure 2:
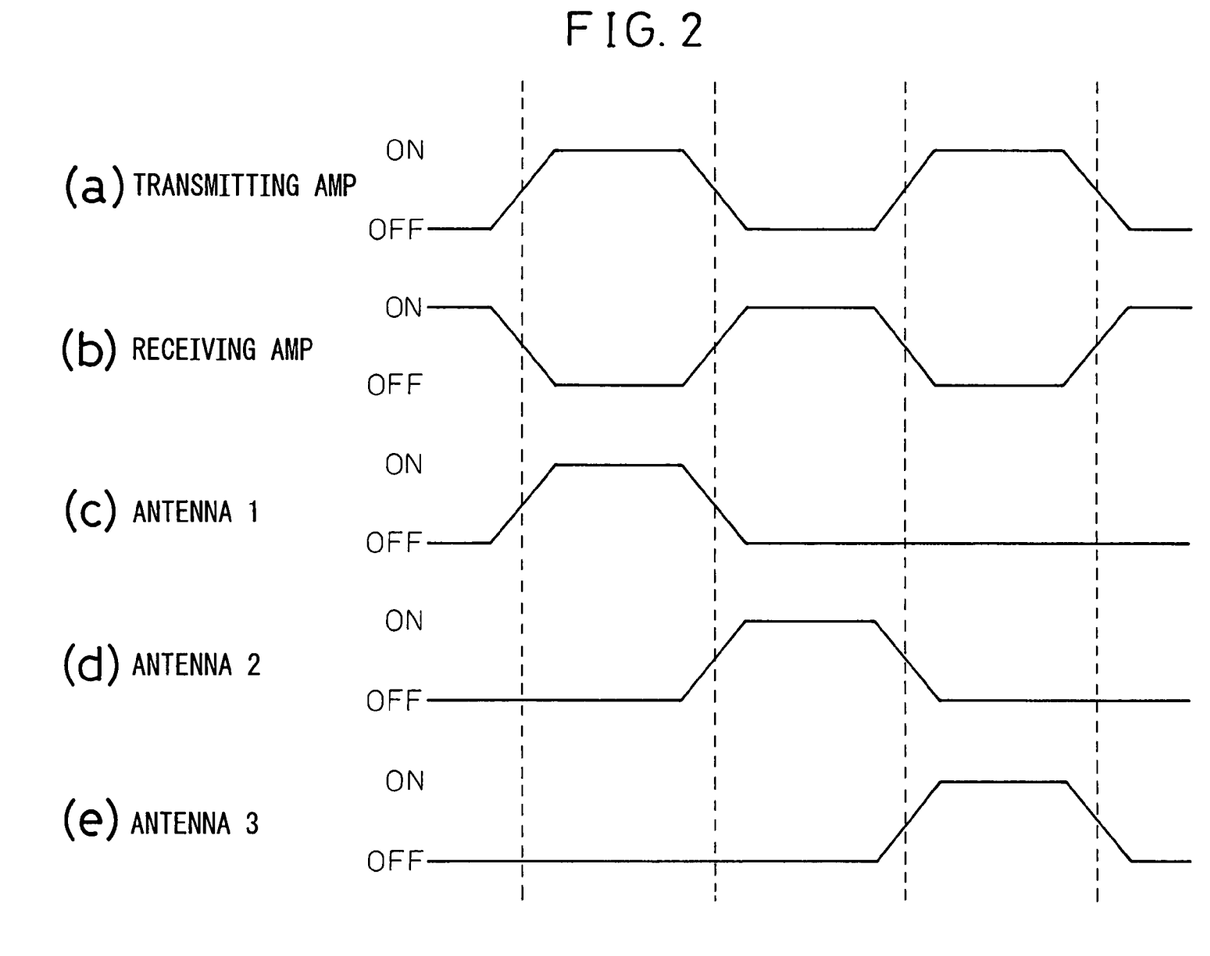
FIG. 2 is a timing chart for explaining the operation of the radar of FIG. 1.

In connection with the foregoing, if a configuration such as shown in FIG. 1, in which a duplexer 14 is used in conjunction with a switch 12 that selects one of a plurality of antennas 10 for transmission or reception and if the on/off timing of the transmitting amplifier 16 and the receiving amplifier 18 can be adjusted accurately as shown in parts (a) and (b) of FIG. 2 by some kind of means, it is still necessary to make the timing for setting the switch 12 to select the transmitting antenna or the receiving antenna (parts (c), (d), and (e)) match the on/off timing of the transmitting amplifier 16 and the receiving amplifier 18.

SUMMARY OF THE INVENTION

Accordingly, it is a first object of the present invention to provide a method for accurately adjusting on/off timing in a radar in which a duplexer is used and a transmitting amplifier and a receiving amplifier are turned on and off in alternating fashion, and to provide a radar apparatus having an automatic timing adjusting function for implementing such a method.

It is a second object of the present invention to provide a method for accurately adjusting on/off timing of an amplifier and antenna selection timing of an antenna selecting switch in a radar in which a duplexer is used in conjunction with the antenna selecting switch.

According to the present invention, there is provided a timing adjustment method for use in a radar comprising a transmitting amplifier for amplifying a transmit signal, a receiving amplifier for amplifying a received signal, a duplexer, connected to an output side of the transmitting amplifier, an input side of the receiving amplifier, and an antenna, for permitting alternate use of the antenna for both transmission and reception, and a mixer for mixing a portion of the transmit signal with the received signal, the timing adjustment method for adjusting timing for turning on and off the transmitting amplifier and the receiving amplifier in alternating fashion, comprising the steps of: stopping modulation of the transmit signal; generating a time average of a voltage level output from the mixer; adjusting, after stopping the modulation, relative on/off timing of the transmitting amplifier and the receiving amplifier so that the time average becomes minimum.

When modulation of the transmit signal is stopped, a DC level corresponding to the phase difference between the transmit wave consisting only of a carrier and the received wave is output from the mixer during the period that the transmitting amplifier and the receiving amplifier are both ON; on the other hand, during the period that either one is OFF, the output is a zero level. Accordingly, by adjusting the timing so that the time average of the output level becomes minimum, the on/off timing of the amplifiers can be accurately adjusted.

By setting a 1:N switch so as not to select any one of the antennas and, thereby, totally reflecting the transmit signal to the receiving side, or by placing a reflective object in close proximity to the antenna, the adjustment can be achieved with higher accuracy without relying on a leakage signal in the duplexer.

According to the present invention, there is also provided a timing adjustment method for use in a radar comprising a transmitting amplifier for amplifying a transmit signal, a receiving amplifier for amplifying a received signal, a duplexer connected to an output side of the transmitting amplifier and an input side of the receiving amplifier, a number N of antennas, a 1:N switch, provided between the duplexer and the N antennas, for selecting one of the N antennas and connecting the selected antenna to the duplexer, and a mixer for mixing a portion of the transmit signal with the received signal, the timing adjustment method for adjusting timing for turning on and off the transmitting amplifier and timing for antenna selection in the 1:N switch comprising the steps of: stopping modulation of the transmit signal; setting the receiving amplifier always ON; generating a time average of a voltage level output from the mixer; and adjusting, after stopping the modulation and setting the receiving amplifier always ON, the timing of the antenna selection in the 1:N switch relative to the turning on and off of the transmitting amplifier so that the time average becomes maximum.

When modulation of the transmit signal is stopped, and the receiving amplifier is set always ON, a DC level corresponding to the phase difference between the transmit wave consisting only of a carrier and the reflected wave from a target is output from the mixer during the period that the transmitting amplifier is ON and any one of the antennas is selected; during other periods, the output is at zero level. Accordingly, by adjusting the timing so that the time average of the output level becomes maximum, the period that the transmitting amplifier is ON and the period that the antenna is selected can be made to precisely coincide with each other.

By placing a reflective object in close proximity to the antenna, the adjustment can be achieved with higher accuracy without being affected by a leakage signal in the duplexer.

According to the present invention, there is also provided a radar apparatus having an automatic timing adjusting function, comprising: a transmitting amplifier for amplifying a transmit signal; a receiving amplifier for amplifying a received signal, the receiving amplifier being turned on and off alternately with the transmitting amplifier; a duplexer, connected to an output side of the transmitting amplifier, an input side of the receiving amplifier, and an antenna, for permitting alternate use of the antenna for both transmission and reception; a mixer for mixing a portion of the transmit signal with the received signal; means for stopping modulation of the transmit signal; means for generating a time average of a voltage level output from the mixer; and means for adjusting, after stopping modulation of the transmit signal, relative on/off timing of the transmitting amplifier and the receiving amplifier so that the time average becomes minimum.

According to the present invention, there is also provided a radar apparatus having an automatic timing adjusting function, comprising: a transmitting amplifier for amplifying a transmit signal; a receiving amplifier for amplifying a received signal; a duplexer connected to an output side of the transmitting amplifier and an input side of the receiving amplifier; a number N of antennas; a 1:N switch, provided between the duplexer and the N antennas, for selecting one of the N antennas and connecting the selected antenna to the duplexer; a mixer for mixing a portion of the transmit signal with the received signal; means for stopping modulation of the transmit signal; means for setting the receiving amplifier always ON; means for generating a time average of a voltage level output from the mixer; and means for adjusting, after stopping the modulation and setting the receiving amplifier always ON, the timing of the antenna selection in the 1:N switch relative to the turning on and off of the transmitting amplifier so that the time average becomes maximum.

DESCRIPTION OF THE PREFERRED EMBODIMENTS

Figure 3:
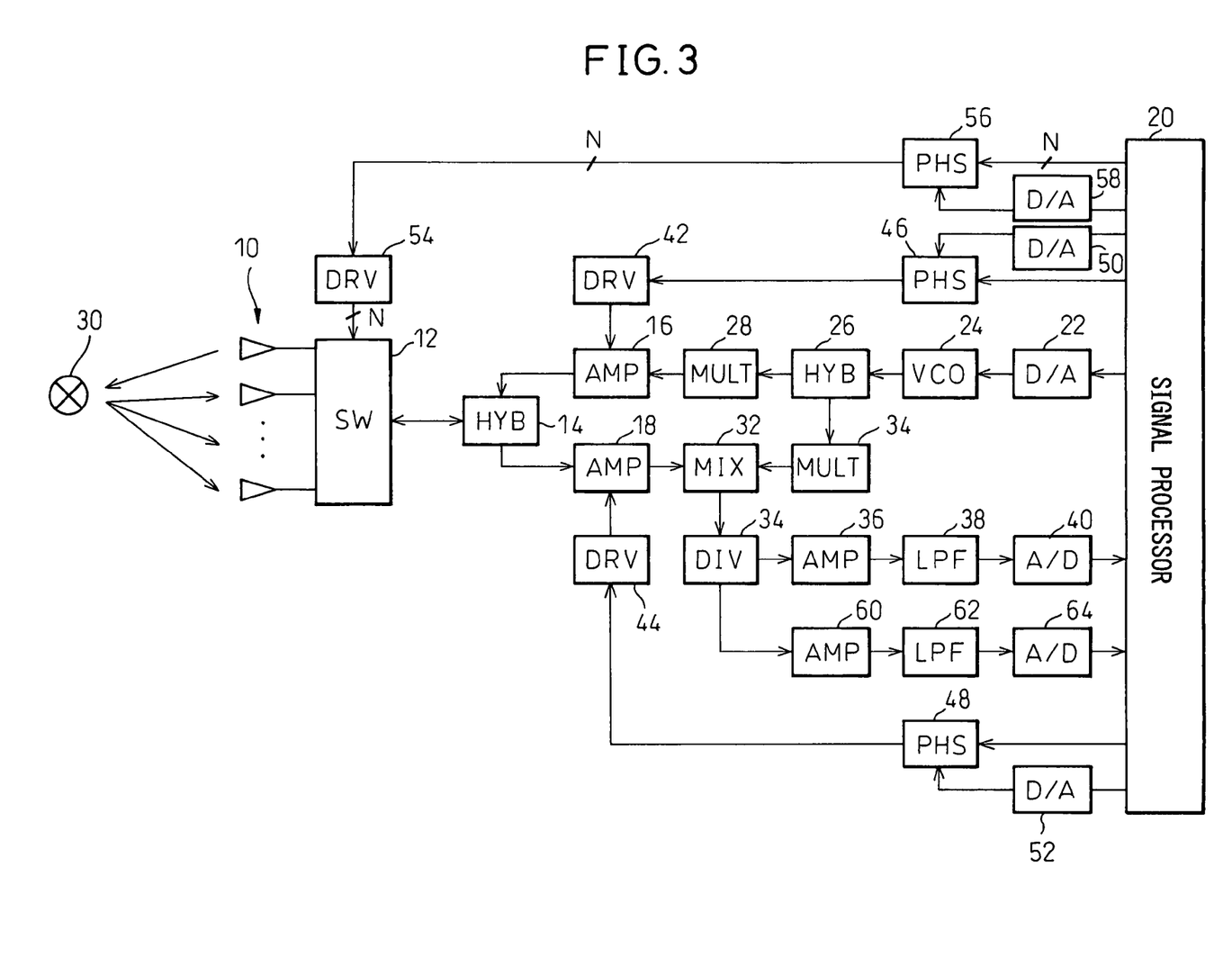
FIG. 3 is a diagram showing one configuration example of a radar apparatus to which the present invention is applied.

FIG. 3 shows one configuration example of a DBF (Digital Beam Forming) FM-CW radar which uses a duplexer and an antenna selecting switch, and to which the present invention is applied. Here, it will be understood that present invention is also applicable to a radar that employs a DBF method.

In FIG. 3, a triangular wave signal as a frequency controlling signal is supplied from a signal processor 20 to a voltage-controlled oscillator (VCO) 24 via a D/A converter 22. The transmit signal frequency-modulated by the triangular wave, output from the VCO 24, is supplied via a hybrid 26 to a multiplier 28 where it is multiplied to produce a millimeter wave, which is then amplified by a transmitting amplifier 16, fed through a hybrid 14 acting as a duplexer, and transmitted out from the one of antennas 10 that is selected by a switch 12.

Reflected waves returned from a target are received by the antennas 10, and the signal received at the one antenna 10 selected by the switch 12 is supplied via the hybrid 14 to a receiving amplifier 18 where the signal is amplified and supplied to one input of a mixer 32. A portion of the transmit signal, separated by the hybrid 26 and multiplied by a multiplier 34, is supplied to the other input of the mixer 32 where it is mixed with the received signal to produce a beat signal.

The beat signal output from the mixer 32 is supplied via a divider 34 to an amplifier 36 where it is amplified, and the amplified signal is passed through a low-pass filter 38 and converted by an A/D converter 40 into a digital signal which is input to the signal processor 20. The signal processor 20 performs an FFT (Fast Fourier Transform) operation on the beat signal, and computes the distance and relative velocity of the target from the frequencies produced during the increasing section and the decreasing section of the triangular wave for the same target. Further, the direction in which the target is located is determined from the phase difference between the signals received by the respective antennas from the same target.

Bias voltages to the amplifiers 16 and 18 can be turned on and off by means of drivers 42 and 44, respectively, the drivers 42 and 44 being controlled by control signals supplied from the signal processor 20 via phase shifters 46 and 48, respectively. The amounts of phase shift in the respective phase shifters 46 and 48 are increased or decreased in accordance with analog signals supplied from the signal processor 20 via D/A converters 50 and 52, respectively. Likewise, antenna selection in the switch 12 is controlled by a driver 54, which in turn is controlled by a control signal supplied from the signal processor 20 via a phase shifter 56; the amount of phase shift in the phase shifter 56 is increased or decreased in accordance with an analog signal supplied from the signal processor 20 via a D/A converter 58.

In the present invention, modulation of the transmit wave is stopped by stopping the triangular wave being supplied from the signal processor 20 via the D/A converter 22 to the VCO 24, and the on/off timing of the amplifiers 16 and 18 and the antenna selection timing in the switch 12 are adjusted by measuring the DC voltage level that is output at this time from the mixer and that corresponds to the phase difference between the transmit wave and the received wave. The line leading from the divider 34 via an amplifier 60, a low-pass filter 62, and an A/D converter 64 to the signal processor 20 is provided for measuring the DC voltage level at this time.

Figure 4:
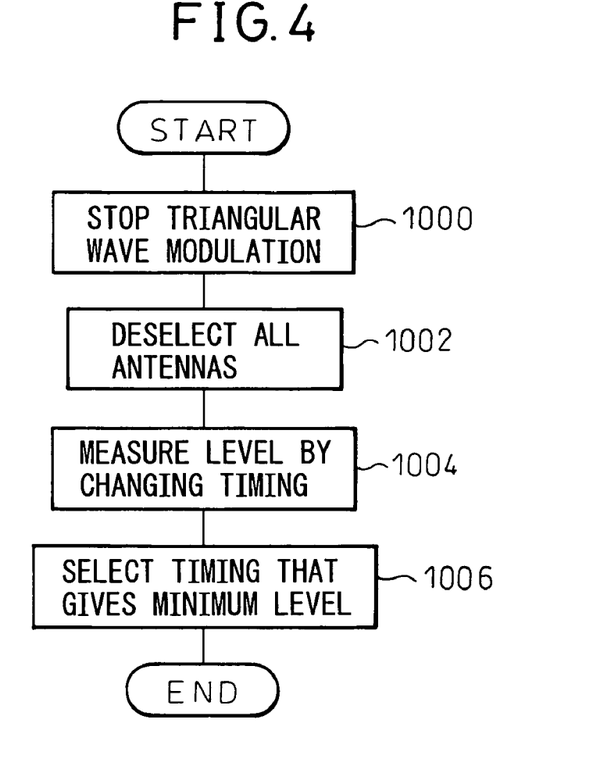
FIG. 4 is a flowchart illustrating a timing adjusting process as a first embodiment of the present invention.
Figure 5:
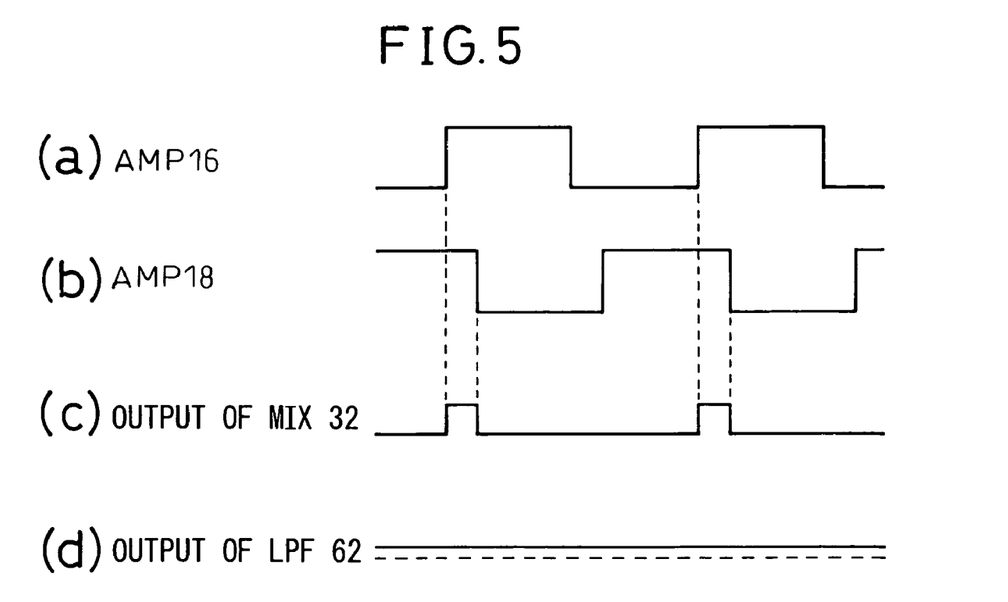
FIG. 5 is a timing chart for various parts in FIG. 3.

FIG. 4 is a flowchart illustrating the processing preformed in the signal processor 20 for automatic adjustment of the on/off timing of the amplifiers 16 and 18. To adjust the on/off timing of the amplifiers 16 and 18, first, the modulation of the transmit signal is stopped by causing the digital value being supplied to the D/A converter 22 to stop changing (step 1000), and the switch 12 is set so as not to select any one of the antennas, thereby totally reflecting the transmit signal to the hybrid 14 side input of the switch 12 (step 1002). In this case, during the period that either the transmitting amplifier 16 (see part (a) of FIG. 5) or the receiving amplifier 18 (see part (b)) is OFF, the output of the mixer 32 is at zero level as shown in part (c) of FIG. 5, because the received wave is not input to the mixer during the OFF period; on the other hand, during the period that both amplifiers are ON, a voltage proportional to the phase difference between the transmit wave and the received wave is output. Since the voltage is integrated and averaged over time by the low-pass filter 62 (see part (d)), the on/off timing of the amplifiers should be adjusted so that this average level becomes minimum. Therefore, in step 1004, the level is measured at several points by changing the timing around a default value (step 1004), and the timing that gives the minimum level is selected (step 1006).

This automatic adjustment needs to be performed before shipment of the product to accommodate manufacturing variations among products, but may also be performed periodically when the vehicle equipped with the radar is stationary in order to correct for variations of the parts over time. Further, to compensate for temperature variations, a temperature measuring means such as a thermistor or a thermocouple for measuring the apparatus temperature may be provided in the radar apparatus, and the temperature characteristics obtained by obtaining timing adjustment values at various temperatures may be stored in the form of a table, with provisions made to automatically correct the timing adjustment value according to the temperature of the apparatus in operation by using the temperature characteristics. Furthermore, to compensate for variations over time of the temperature characteristics, provisions may be made to correct the temperature characteristics by using the relationship between the timing adjustment value and the value of the temperature obtained when the vehicle is stationary.

Figure 6:
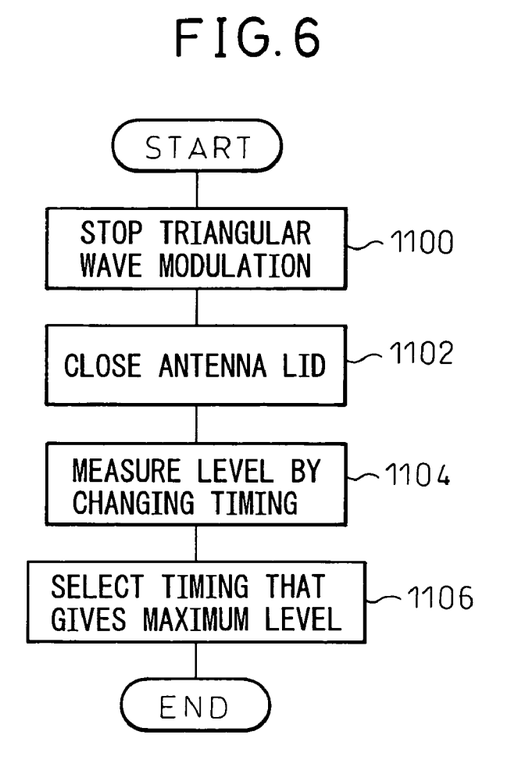
FIG. 6 is a flowchart illustrating a timing adjusting process as a second embodiment of the present invention.
Figure 7:
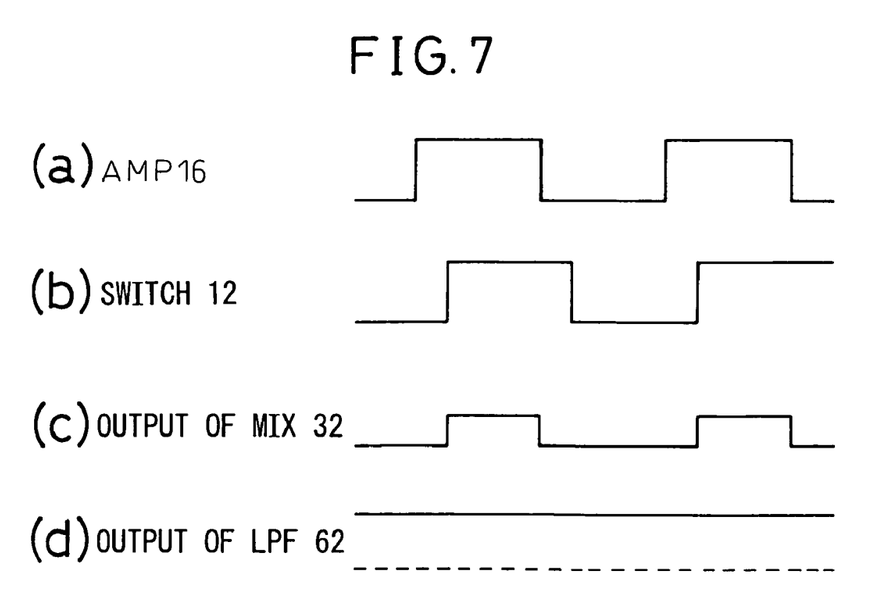
FIG. 7 is a timing chart for various parts in FIG. 5.

FIG. 6 is a flowchart illustrating the processing performed in the signal processor 20, after completion of the automatic adjustment of the on/off timing of the amplifiers 16 and 18, in order to make the ON period of the amplifier 16 coincide with the period that any one of the antennas is selected by the switch 12. First, in the same manner as when adjusting the on/off timing of the amplifiers 16 and 18, modulation of the transmit signal is stopped by causing the digital value being supplied to the D/A converter 22 to stop changing (step 1100), and a reflective object is placed in close proximity to the antenna, for example, by closing an open/close lid (step 1102). In this case, during the period that the transmitting amplifier 16 is ON (see part (a) of FIG. 7) and one of the antennas is selected by the switch 12 (see part (b)), the mixer 32 outputs a voltage proportional to the phase difference between the transmitted wave and the received wave, as shown in part (c) of FIG. 7; during other periods, the voltage is at zero level (see part (c)). As the voltage is integrated and averaged over time by the low-pass filter 62 (see part (d)), the selection timing in the switch 12 should be adjusted so that the average level becomes maximum. Therefore, in step 1004, the level is measured by changing the timing at several points centered about a default value (step 1104), and the timing that gives the maximum level is selected (step 1106).

This automatic adjustment also needs to be performed before shipment of the product to accommodate manufacturing variations among products, but may also be performed periodically when the vehicle equipped with the radar is stationary in order to correct for variations of the parts over time. Further, to compensate for temperature variations, a temperature measuring means such as a thermistor or a thermocouple for measuring the apparatus temperature may be provided in the radar apparatus, and the temperature characteristics obtained by obtaining timing adjustment values at various temperatures may be stored in the form of a table, with provisions made to automatically correct the timing adjustment value according to the temperature of the apparatus in operation by using the temperature characteristics. Furthermore, provisions may also be made to correct the temperature characteristics by using the relationship between the timing adjustment value and the value of the temperature obtained when the vehicle is stationary.

The invention claimed is:

1. A timing adjustment method of adjusting timing for turning on and off a transmitting amplifier and a receiving amplifier in alternating fashion, for use in a radar comprising the transmitting amplifier for amplifying a transmit signal, the receiving amplifier for amplifying a received signal, a duplexer, connected to an output side of said transmitting amplifier, an input side of said receiving amplifier, and an antenna, for permitting alternate use of said antenna for both transmission and reception, and a mixer for mixing a portion of said transmit signal with said received signal, said method comprising the steps of:

(a) stopping modulation of said transmit signal; and
(b) adjusting, after said step (a), relative on/off timing of said transmitting amplifier and said receiving amplifier, based on a voltage level output from said mixer.

2. A timing adjustment method for use in a radar according to claim 1, further comprising the step of (c) generating a time average of said voltage level, wherein in said step (b) said timing is adjusted so that said time average becomes a minimum.

3. A timing adjustment method for use in a radar according to claim 1, wherein said antenna consists of a number N of antennas, and said radar further comprises a 1:N switch for selectively connecting said duplexer to one of said N antennas, and wherein said method further comprises, before said step (b), the step of:

(d) setting said 1:N switch so as not to select any one of said N switches, thereby totally reflecting said transmit signal to a receiving side.

4. A timing adjustment method for use in a radar according to claim 2, wherein said radar further comprises: a divider for dividing the output of said mixer between a first branch path for signal processing for radar operation and a second branch path for detection of said voltage level; and a low-pass filter, provided in said second branch path, for generating said time average by integrating said voltage level output from said mixer.

5. A timing adjustment method for use in a radar according to claim 1, wherein said radar is an automotive radar, and said step (b) is automatically executed when a vehicle equipped with said radar is stationary.

6. A timing adjustment method for use in a radar according to claim 1, wherein said radar further comprises a temperature measuring means for measuring a temperature, and wherein said method further comprises the steps of:
 (e) prestoring relations between a plurality of adjustment values for said timing, obtained at different temperatures, and said temperatures; and
 (f) automatically adjusting said timing based on said prestored relations between said timing adjustment values and said temperatures and on the temperature measured by said temperature measuring means.

7. A timing adjustment method for use in a radar according to claim 1, wherein said radar is an automotive radar, said step (b) is automatically executed when a vehicle equipped with said radar is stationary, and said radar further comprises a temperature measuring means for measuring a temperature, and wherein said method further comprises the steps of:
 (e) prestoring relations between a plurality of adjustment values for said timing, obtained at different temperatures, and said temperatures;
 (f) automatically adjusting said timing based on said prestored relations between said timing adjustment values and said temperatures and on the temperature measured by said temperature measuring means;
 (g) correcting said prestored relations between said timing adjustment values and said temperatures, based on the timing adjustment value obtained by the automatic execution of said step (b).

8. A radar apparatus having an automatic timing adjusting function, comprising:
 a transmitting amplifier for amplifying a transmit signal;
 a receiving amplifier for amplifying a received signal, said receiving amplifier being turned on and off alternately with said transmitting amplifier;
 a duplexer, connected to an output side of said transmitting amplifier, an input side of said receiving amplifier, and an antenna, for permitting alternate use of said antenna for both transmission and reception;
 a mixer for mixing a portion of said transmit signal with said received signal;
 a unit stopping modulation of said transmit signal;
 a unit generating a time average of a voltage level output from said mixer; and
 a unit adjusting, after stopping modulation of said transmit signal, relative on/off timing of said transmitting amplifier and said receiving amplifier so that said time average becomes a minimum.

9. A radar apparatus having an automatic timing adjusting function according to claim 8, wherein said antenna consists of a number N of antennas, and said radar apparatus further comprises:
 a 1:N switch for selectively connecting said duplexer to one of said N antennas; and
 a unit setting, before the timing adjustment by said timing adjusting unit, said 1:N switch so as not to select any one of said N antennas, thereby totally reflecting said transmit signal to a receiving side.

10. A radar apparatus having an automatic timing adjusting function according to claim 8, further comprising a divider for dividing the output of said mixer between a first branch path for signal processing for radar operation and a second branch path for detection of said voltage level, and wherein
 said time average generating unit includes a low-pass filter, provided in said second branch path, for generating said time average by integrating said voltage level output from said mixer.

11. A radar apparatus having an automatic timing adjusting function according to claim 8, wherein said radar apparatus is an automotive radar apparatus, and the timing adjustment by said timing adjusting unit is automatically executed when a vehicle equipped with said radar apparatus is stationary.

12. A radar apparatus having an automatic timing adjusting function according to claim 8, further comprising:
 a temperature measuring unit measuring a temperature;
 a unit prestoring relations between a plurality of adjustment values for said timing, obtained at different temperatures, and said temperatures; and
 a unit automatically adjusting said timing based on said prestored relations between said timing adjustment values and said temperatures and on the temperature measured by said temperature measuring unit.

13. A radar apparatus having an automatic timing adjusting function according to claim 8, wherein said radar apparatus is an automotive radar apparatus, and the timing adjustment by said timing adjusting unit is automatically executed when a vehicle equipped with said radar apparatus is stationary, and wherein said radar apparatus further comprises:
 a temperature measuring unit measuring a temperature;
 a unit prestoring relations between a plurality of adjustment values for said timing, obtained at different temperatures, and said temperatures;
 a unit automatically adjusting said timing based on said prestored relations between said timing adjustment values and said temperatures and on the temperature measured by said temperature measuring unit; and
 a unit correcting said prestored relations between said timing adjustment values and said temperatures, based on the timing adjustment value obtained by the automatic execution of said timing adjustment by said timing adjusting unit.

14. A timing adjustment method of adjusting timing for turning on and off a transmitting amplifier and timing for reception switching in a signal receiving path for use in a radar comprising the transmitting amplifier for amplifying a transmit signal, a receiving amplifier for amplifying a received signal, a duplexer connected to an output side of said transmitting amplifier and an input side of said receiving amplifier and a mixer for mixing a portion of said transmit signal with said received signal, said method comprising the steps of:

(a) stopping modulation of said transmit signal; and (b) adjusting, after said step (a), the timing of said switching in said signal receiving path relative to the turning on and off of said transmitting amplifier, based on a voltage level output from said mixer.

15. A radar apparatus having an automatic timing adjusting function, comprising:

a transmitting amplifier for amplifying a transmit signal;

a receiving amplifier for amplifying a received signal;

a duplexer connected to an output side of said transmitting amplifier and an input side of said receiving amplifier;

a mixer for mixing a portion of said transmit signal with said received signal;

a unit stopping modulation of said transmit signal;

a unit generating a time average of a voltage level output from said mixer; and a unit adjusting, after stopping modulation of said transmit signal, timing of reception switching in a signal receiving path relative to the turning on and off of said transmitting amplifier based on said time average.

* * * * *

UNITED STATES PATENT AND TRADEMARK OFFICE
CERTIFICATE OF CORRECTION

PATENT NO. : 7,295,152 B2  Page 1 of 1
APPLICATION NO. : 11/137203
DATED : November 13, 2007
INVENTOR(S) : Nobukazu Shima It is certified that error appears in the above-identified patent and that said Letters Patent is hereby corrected as shown below:

Column 8, line 36, Claim 13     Delete "compnses",
                                Insert --comprises--

Signed and Sealed this

Twenty-ninth Day of July, 2008

JON W. DUDAS
*Director of the United States Patent and Trademark Office*